(12) United States Patent
Alford et al.

(10) Patent No.: US 11,505,074 B2
(45) Date of Patent: *Nov. 22, 2022

(54) CORD REEL VARIABLE CURRENT THERMAL MANAGEMENT AND DAMAGE DETECTION

(71) Applicants: John Alford, Kenosha, IL (US); Peter Veiga, Zion, IL (US); Paul Burke, Gurnee, IL (US)

(72) Inventors: John Alford, Kenosha, IL (US); Peter Veiga, Zion, IL (US); Paul Burke, Gurnee, IL (US)

(73) Assignee: Konnectronix, Inc., Waukegan, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/165,532

(22) Filed: Feb. 2, 2021

(65) Prior Publication Data

US 2021/0155105 A1 May 27, 2021

Related U.S. Application Data

(63) Continuation of application No. 16/286,180, filed on Feb. 26, 2019, now Pat. No. 10,906,417, which is a (Continued)

(51) Int. Cl.
*H02J 7/00* (2006.01)
*B60L 53/18* (2019.01)
(Continued)

(52) U.S. Cl.
CPC ............... *B60L 53/18* (2019.02); *B60L 53/30* (2019.02); *H02G 3/00* (2013.01); *H02J 7/0013* (2013.01);
(Continued)

(58) Field of Classification Search
CPC .......... H02J 7/00; H02J 7/0013; H02J 7/0042; B60K 1/00; B60M 1/34; B60L 1/00;
(Continued)

(56) References Cited

U.S. PATENT DOCUMENTS 4,656,320 A * 4/1987 Maddock ............... H02G 11/02
191/12.4
8,922,967 B2 * 12/2014 Goelz ................ H01R 13/6683
361/103

(Continued)

FOREIGN PATENT DOCUMENTS

JP 2012207976 A * 10/2012
JP 2013090153 A * 5/2013

OTHER PUBLICATIONS

Qiu et al., Chinese Patent Document No. CN 202405549 U, published Aug. 29, 2012, abstract and 1 drawing. (Year: 2012).*

*Primary Examiner* — Phallaka Kik
(74) *Attorney, Agent, or Firm* — Vitale, Vickrey, Niro & Gasey

(57) ABSTRACT

A battery charging assembly includes a load management system, a charging cord with a battery connector, and circuitry for detecting thermal buildup. The load management system monitors the heat buildup in a coiled portion of the charging cord and issues a corresponding signal to control the current flowing through the cord.

4 Claims, 6 Drawing Sheets

Related U.S. Application Data continuation-in-part of application No. 15/141,012, filed on Apr. 28, 2016, now Pat. No. 10,214,114, which is a continuation of application No. 14/997,884, filed on Jan. 18, 2016, now abandoned, and a continuation of application No. 13/968,268, filed on Aug. 15, 2013, now Pat. No. 9,238,416.

(51) Int. Cl.
*B60L 53/30* (2019.01)
*B60L 1/00* (2006.01)
*B60L 3/00* (2019.01)
*H02G 3/00* (2006.01)
*B60K 1/00* (2006.01)
*B60M 1/34* (2006.01)

(52) U.S. Cl.
CPC . *B60K 1/00* (2013.01); *B60L 1/00* (2013.01); *B60L 3/00* (2013.01); *B60M 1/34* (2013.01); *H02J 7/0042* (2013.01); *Y02T 90/10* (2013.01)

(58) Field of Classification Search
CPC .... B60L 3/00; B60L 11/1824; B60L 11/1816; B60L 2230/12; B60L 53/18; B60L 53/30; H02G 3/00; Y02T 90/10; Y02T 90/121; Y02T 10/6286
USPC .......... 320/109; 180/65.1; 191/27; 307/10.1
See application file for complete search history.

(56) References Cited

U.S. PATENT DOCUMENTS

| | | | |
|---|---|---|---|
| 9,108,519 B2 * | 8/2015 | Tamaki | B60L 50/66 |
| 9,238,416 B2 * | 1/2016 | Alford | H02J 7/0026 |
| 9,263,907 B2 * | 2/2016 | Richardson | B60L 53/68 |
| 9,490,640 B2 * | 11/2016 | Pham | H02J 7/04 |
| 9,780,552 B2 * | 10/2017 | Kimoto | B60R 16/02 |
| 10,214,114 B2 * | 2/2019 | Alford | B60L 53/31 |
| 10,661,658 B2 * | 5/2020 | Anma | B62M 7/12 |
| 10,714,959 B2 * | 7/2020 | Yamada | B60L 53/16 |
| 10,749,370 B2 * | 8/2020 | Steinbuchel, IV | B60L 58/25 |
| 10,906,417 B2 * | 2/2021 | Alford | H02J 7/0013 |
| 10,960,781 B2 * | 3/2021 | Myer | H05K 7/2089 |
| 11,034,260 B2 * | 6/2021 | Dickinson | H02J 7/0029 |
| 11,117,479 B2 * | 9/2021 | Fuhrer | H02J 7/0047 |
| 2009/0195237 A1 * | 8/2009 | Feliss | B60L 53/62 323/318 |
| 2011/0023874 A1 * | 2/2011 | Bath | A61M 16/0066 128/202.22 |
| 2011/0169447 A1 * | 7/2011 | Brown | B60L 53/16 320/109 |
| 2011/0172839 A1 * | 7/2011 | Brown | B60L 53/16 700/292 |
| 2011/0278079 A1 * | 11/2011 | Stoicoviciu | H02J 7/35 180/2.1 |
| 2012/0049797 A1 * | 3/2012 | Tamaki | B60L 53/16 320/109 |
| 2012/0176086 A1 * | 7/2012 | Nakamura | B62K 11/10 320/109 |
| 2012/0206100 A1 * | 8/2012 | Brown | B60L 3/0069 320/109 |
| 2012/0321914 A1 * | 12/2012 | Ventura Fores | H01M 10/486 429/7 |
| 2013/0171480 A1 * | 7/2013 | Englert | H01M 10/443 429/50 |
| 2014/0091772 A1 * | 4/2014 | Del Core | B60L 58/26 320/136 |
| 2014/0131341 A1 * | 5/2014 | Rothschild | H05B 1/0227 219/209 |
| 2014/0236138 A1 * | 8/2014 | Tran | A61B 18/1492 606/33 |
| 2014/0306528 A1 * | 10/2014 | Decesaris | G06F 1/26 307/31 |
| 2014/0318153 A1 * | 10/2014 | Ilercil | F25D 11/00 62/3.3 |
| 2016/0107530 A1 * | 4/2016 | Roberts | B60L 53/16 320/109 |
| 2016/0339786 A1 * | 11/2016 | Dickinson | B60L 3/04 |
| 2019/0067973 A1 * | 2/2019 | Yamada | H02J 7/00 |
| 2019/0181676 A1 * | 6/2019 | Steinbuchel, IV | G01R 31/3646 |
| 2020/0094688 A1 * | 3/2020 | Myer | H02J 7/007192 |

\* cited by examiner

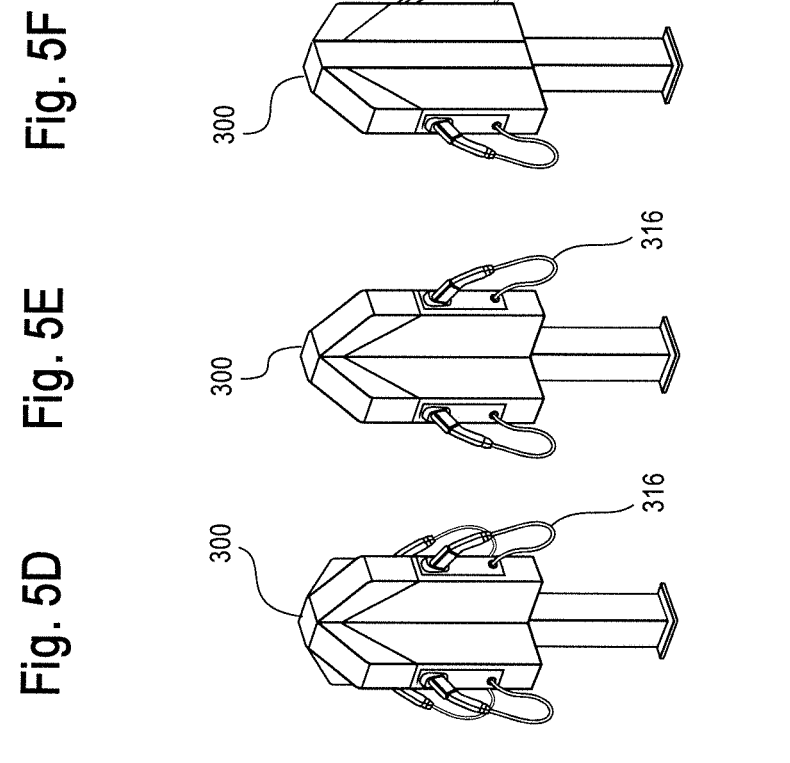

CORD REEL VARIABLE CURRENT THERMAL MANAGEMENT AND DAMAGE DETECTION

This application is a continuation of application Ser. No. 16/286,180, now U.S. Pat. No. 10,906,417 which is a continuation in part of prior application Ser. No. 15/141,012, now U.S. Pat. No. 10,214,114, which is a continuation of Ser. No. 14/997,884 (which was abandoned), which is a continuation of application Ser. No. 13/968,268, now U.S. Pat. No. 9,238,416. The Applicant hereby incorporates by reference application Ser. Nos. 14/997,884 and 13/968,268, now U.S. Pat. No. 9,238,416 in their entireties.

FIELD OF THE INVENTION

The present invention relates generally to various solutions for the management of the generation of heat in a retractable cord reel apparatus delivering electrical power. In some embodiments, the invention more is directed to specifically to insuring that the flow of electrical current in a cord which may be partially or fully coiled on a reel does not result in generation of excessive heat which could damage the cord, reduce its useful life, or create danger to the user. Cords used for charging batteries in, for example, electric vehicles, are frequently coiled when not in use to safely store the cord and protect it from the elements and damage.

A retractable cord reel may be part of a charging station in, for example, a parking lot at an airport or in a home or office garage. The charging station may be a post or other suitable structure containing the cord reel and associated circuitry. If used in a public location, storing the cord on a reel helps protect against theft of the cord for its copper, because the charging station can require use of a key card or similar means to allow use of the station.

In some embodiments of the present invention, the cord may be only partially unreeled when used to charge a battery. In other embodiments, the cord may only be partially extended (e.g., through a coiled cable or "curly cord") that is extended or retracted through a coaxial connector via a reel. Heat generated by the flow of current will not escape as readily from a cord carrying electrical current when the cord is partially or completely coiled or retracted. As the amount of cord on the reel increases, more heat tends to be trapped. Overheating could occur even if the cord is simply looped over a hook, rather than being stored on a rotating reel.

The cord reel assembly described here includes improved features venting heat buildup and/or for limiting the current flow in the cord, with higher currents being permitted if the cord is substantially or fully unreeled, and for sensing the temperature of the reeled cord at one or more locations. Current flow therefore need not be limited to an unnecessarily low value suitable for a cord that is fully coiled. Higher currents, and therefore shorter charging times, are made possible.

BACKGROUND OF THE INVENTION

Retractable cord reels have been used in various applications to retractably store various types of cables. Typically, a reel might have a stationary end and a retractable end, the retractable end capable of extension from and retraction back into the reel, and which can be connected to, for example, a battery in an electric vehicle. Using a reel provides convenient storage for the cord. The reel also protects the cord from damage, since it need not be left on the ground. Damage to the cord is reduced. The hazard presented to a user by a damaged electrical cord is also avoided.

The use of a reel has a disadvantage, because the flow of current generates heat in the cord. A larger current tends to generate more heat. One application is a charging station for an electric vehicle. If the user parks his electric vehicle very close to the charging station, or if the vehicle is small, it may not be necessary to unreel more than a short length of cord sufficient to reach the battery connector on the vehicle. As current flows from the charging station to the vehicle, heat will be generated in the cord. Because most of the cord is coiled on the reel, heat cannot escape as readily, and the cord temperature can rise, possibly to the point where the function of the charging station, or the safety of the user, is jeopardized. An additional factor is the lack of experience or knowledge on the part of many vehicle operators.

Definition of Terms

The following terms are used in the claims of the patent as filed and are intended to have their broadest plain and ordinary meaning consistent with the requirements of the law:

A "retractable cord reel" refers to a cable storage unit and cable management systems having a spooling cord such as the type found in U.S. Pat. No. 5,094,396 to Burke, the subject matter of which is hereby incorporated by reference, and U.S. Patent Application No. 2007/0262185 to Burke, the subject matter of which is also hereby incorporated by reference. Depending upon the embodiment, the reel may coil the charging cable itself, or it may coil a supporting mechanical cord reel.

An electric vehicle means any vehicle, including one propelled solely by a rechargeable battery, and one using hybrid propulsion including a rechargeable battery. The vehicle can further include—but is not limited to—cars, trucks, motorcycles, electrical bicycles and scooters.

Where alternative meanings are possible, the broadest meaning is intended. All words used in the claims set forth below are intended for use in the normal, customary usage of grammar and the English language.

SUMMARY OF THE INVENTION

The present invention relates to one or more of the following features, elements or combinations thereof.

One disclosed embodiment is directed to improvements in a retractable cord reel for battery charging stations, including those used for vehicles propelled at least in part by rechargeable batteries. The charging station includes an electric cord connected to a source of power. An end of the cord has a vehicle connector assembly. Control circuitry regulates the current supplied to the battery being charged. The reel has one or more temperature sensors for determining the thermal buildup in the cord. The control circuitry includes a processor that receives an input signal from one or more of the sensors. The processor issues an output signal that is related to the input signal from the sensor or sensors. The output signal limits the charging current being supplied to the battery, so that the cord does not overheat. Heat generated in the cord is safely dissipated.

In another embodiment, the disclosed apparatus includes a sensor for determining the amount of cord that has been unreeled. As the length of unreeled cord increases, the processor receives an input signal representative of the length of unreeled cord, and issues an output signal increasing the maximum allowable current to the battery being charged.

In still another embodiment, the present disclosure includes a cord reel that spool a mechanical tether is coaxial with the charging cable, which surrounds the tether by virtue of being in a coiled cable or "curly cord" configuration. The charge station further includes venting at its bottom and a channel with opening at the top and the bottom to create a "chimney effect" to dissipate heat and ensure that the power supplies and the air around the power cord and related circuitry remain at or near ambient temperature. Optionally, this embodiment further includes one or more sensors to determine whether the thermal build up in the cord and/or the power supply requires decreasing current supplied to the battery to avoid overheating.

Thus, it can be seen that one object of the disclosed invention is to provide a mechanism for the avoidance of overheating a battery charging station, and in particular the charging cord.

A further object of the present invention is to allow the maximum charging current to be delivered to the battery being charged.

Another object of the invention is to detect damage to the cord, or removal of the cord.

It should be noted that not every embodiment of the claimed invention will accomplish each of the objects of the invention set forth above. For instance, certain claimed embodiments of the invention will not require a temperature sensing device. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

BRIEF DESCRIPTION OF THE DRAWINGS

FIGS. 5a-f show, respectively, perspective view of ground mount, pier mount wall mount, 4 wall mount units on a support post, 2 adjacent wall mount units on a support post, and 2 opposing wall mount units on a support post, each in accord with an embodiment of the present invention.

DETAILED DESCRIPTION OF EMBODIMENTS OF THE INVENTION

Figure 1:
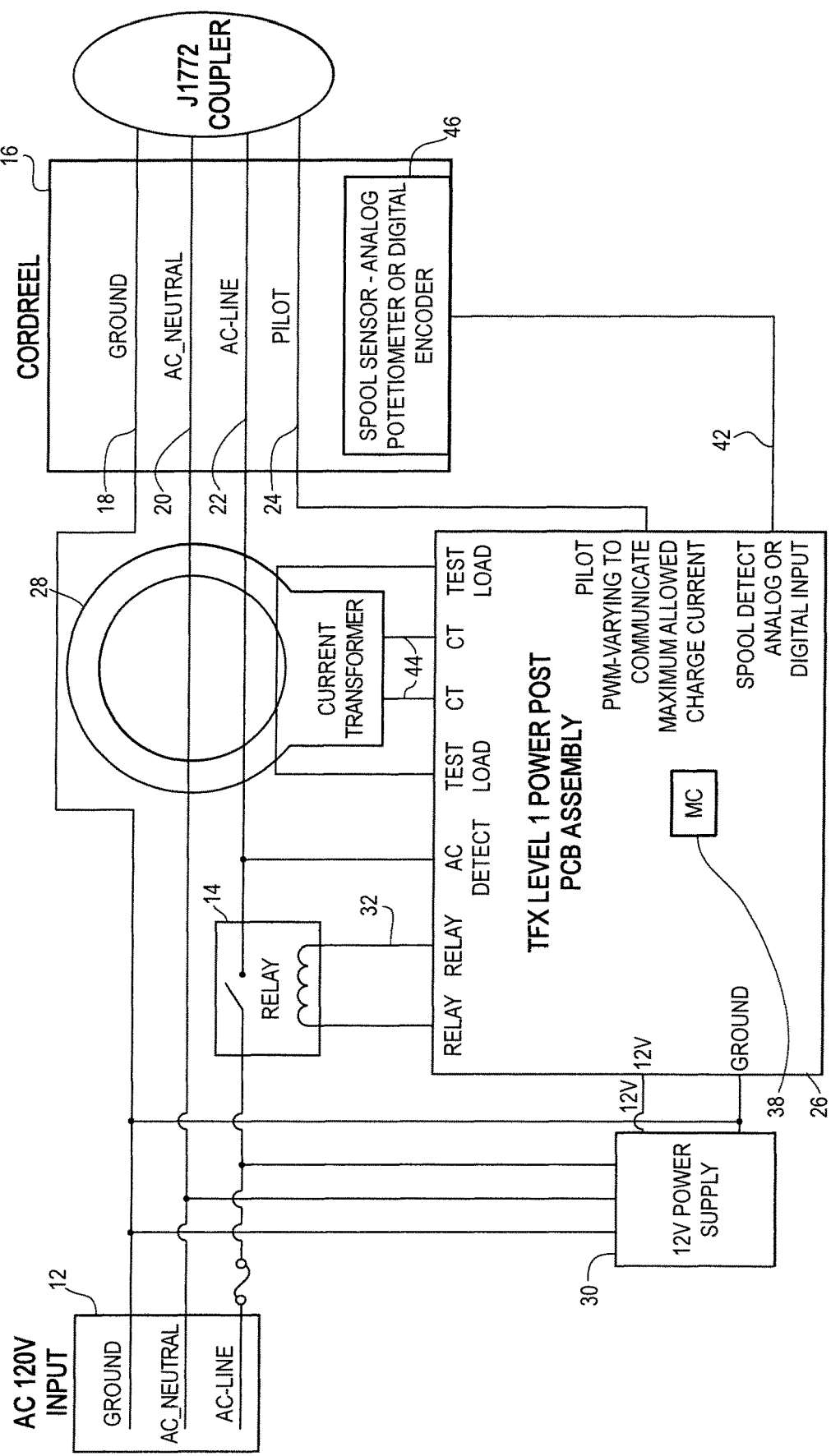
FIG. 1 is a block diagram of a charging station with a cord reel cord reel assembly according to one embodiment of the present invention.

As can be seen in FIG. 1, a charging system 10 includes an alternating current (AC), 120 volt power input 12. AC power is connected to a relay 14, which in this case is a double-pole, single throw switch that makes or breaks connections between power input 12 and a vehicle connector 16. Those of skill will understand that the relay can include connection for either or both of AC-Line and AC_Neutral and/or LINE2 (for the case of a Level 2 charger). In this embodiment, because the battery is used for propulsion in a vehicle, vehicle connector 16 is constructed in accordance with SAE Surface Vehicle Recommended Practice J1772, "SAE Electric Vehicle Conductive Charge Coupler," issued by the Society of Automotive Engineers for electric vehicles. For different applications not involving an electric vehicle, connector 16 need not comply with J1772, and its design can be modified as required by the intended use.

Connector 16 includes electrical connections for ground 18, AC line 20, AC neutral 22 and pilot signal 24. A current transformer 28 is used for ground fault interruption to protect a user from injury. Relay 14, pilot signal 24, and current transformer 28 are connected to board assembly 26. Board assembly 26 controls whether relay 14 is open or closed. The AC connect input between relay 14 and a microcontroller 38 on board assembly 26 may signal microcontroller 38 whether relay 14 is open or closed.

When used for charging an electric vehicle, the preferred embodiment of the system described herein is a Level 1 charger, as that functionality is described by the California Air Resources Board and codified in title 13 of the California Code of Regulations, the U.S. 1999 National Electrical Code section 625 and in SAE International standards. Such systems use lower voltage and are therefore less expensive and suitable for use at a home or other locations where 120 volt AC power is readily available. Due to the relatively low voltage, charging times are longer, possibly as much as ten to twelve hours for a full recharge of an electric vehicle battery. However, those of skill will understand that the present invention as defined by the claims covers not only Level 1 chargers, but also chargers designated as (for instance) Level 2 under those same standards.

The pilot signal for an electric vehicle application according to SAE standard J1772 is a square wave signal with a frequency of one kilohertz. It varies in amplitude between plus and minus 12 volts. A 12 volt power supply 30 provides a reference voltage for the pilot signal 24. Power supply 30 also provides power for microcontroller 38 on board assembly 26. The pilot signal 24 communicates between the vehicle and the board assembly 26. Pilot signal 24 controls the amount of current delivered to the vehicle battery being charged. The amount of current is varied by altering the duty cycle of the square wave, that is, the pulse duration divided by the pulse period. A lookup table stored in the electric vehicle contains the variation in the duty cycle necessary for a given current, though those of skill will understand that the duty cycle could alternatively be generated by an algorithm "on the fly" by using the teaching of the present invention. For example, a duty cycle of 26.7% correlates to a current of 16 amperes under the J1772 standard.

Figure 2:
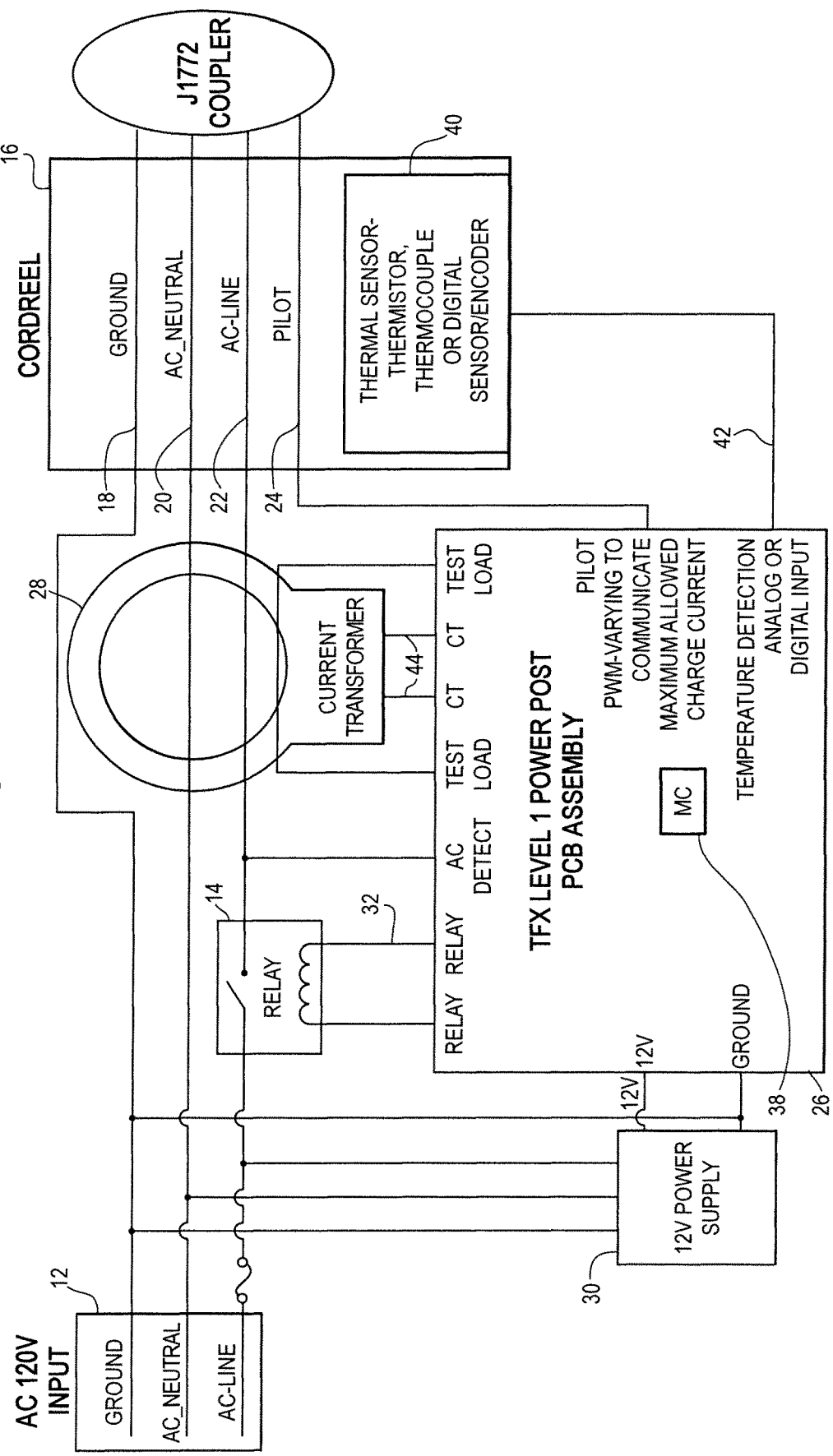
FIG. 2 is a block diagram of a board assembly used with one embodiment of the present invention.

The duty cycle is also varied in the present embodiment according to the amount of cord that is unreeled. The amount may be determined directly or indirectly. For example, a potentiometer attached to the spool or an encoder can be used, which will indicate how much of the cord is unreeled, and therefore indirectly indicate the amount of heat that will be generated in the reeled portion of the cord. A direct measurement of heat generation in the reeled cord can be determined by a thermistor, a thermocouple, or digital temperature sensor installed in the cord reel as shown in FIG. 2. Third, the current transformer 28 and a sensor of reel rotation may be employed with a lookup table stored in the microcontroller identifying the maximum current for a given length of unreeled cord.

Regardless of the type of sensor, the sensor signal is delivered to board assembly 26, as shown in FIG. 2. In this embodiment, board assembly 26 includes an AC relay control 32 that controls relay 14. A pilot driver 34 is on board assembly 26. Driver 34 modulates the pilot signal duty cycle to control the amount of current flowing through the cord to the vehicle battery. A pilot level shifter 36 can receive a signal from the car to confirm or determine, for instance, the current required to bring the car battery to a full charge. Temperature sensor input 42 receives a signal from a potentiometer, thermistor or digital temperature sensor as shown in FIG. 2. Ground fault detection circuit 44 receives an input from current transformer 28. Detection of a fault causes microcontroller 38 to open relay 14, shutting off current.

Relay control 32, driver 34, shifter 36, sensor input 42, and detection circuit 44 are connected to microcontroller 38 which can be programmed by one of skill in the art. One suitable microcontroller is an Atmel ATMEGA328P from Atmel Corporation of San Jose, Calif.

Figure 4A:
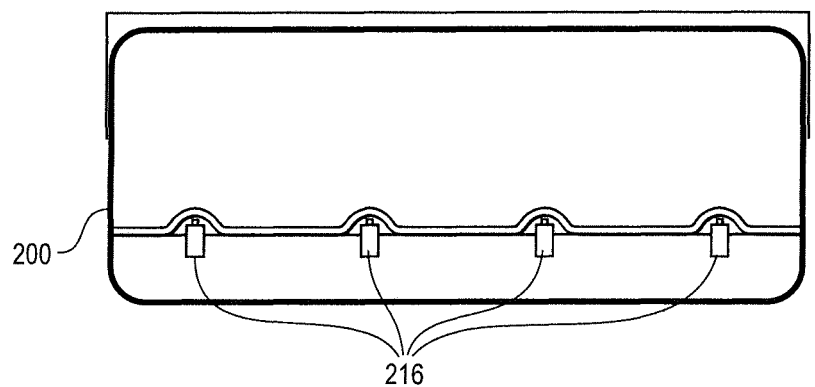
FIGS. 4a and 4b show wall mounted multiple charging cord charge station configurations for multiple cord reels for a single power source in accord with an embodiment of the present invention.
Figure 4B:
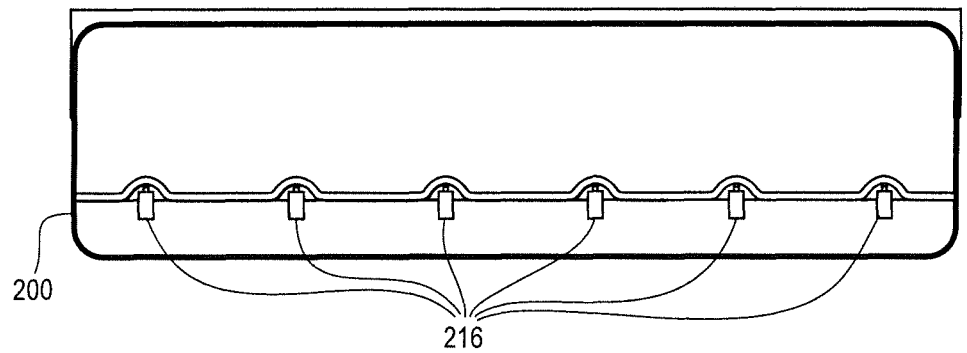

The various form factors of the potential specific applications of these embodiments is shown in FIGS. 4-5. For instance, as shown in FIGS. 4a-c, the charging system 100 can include, for instance, one, four or six connectors 116 depending upon the intended vehicles for charging. For instance, if the charging station is desired to work with scooters or electrical bicycles, the charging station may be desired to have multiple connectors 116 "daisy-chained" off of a single power source. Alternatively, as shown in FIGS. 5a-f, the charging system 200 may be intended for use with cars, truck or the like which required a larger physical footprint for each connector 216 to operate.

Figure 3:
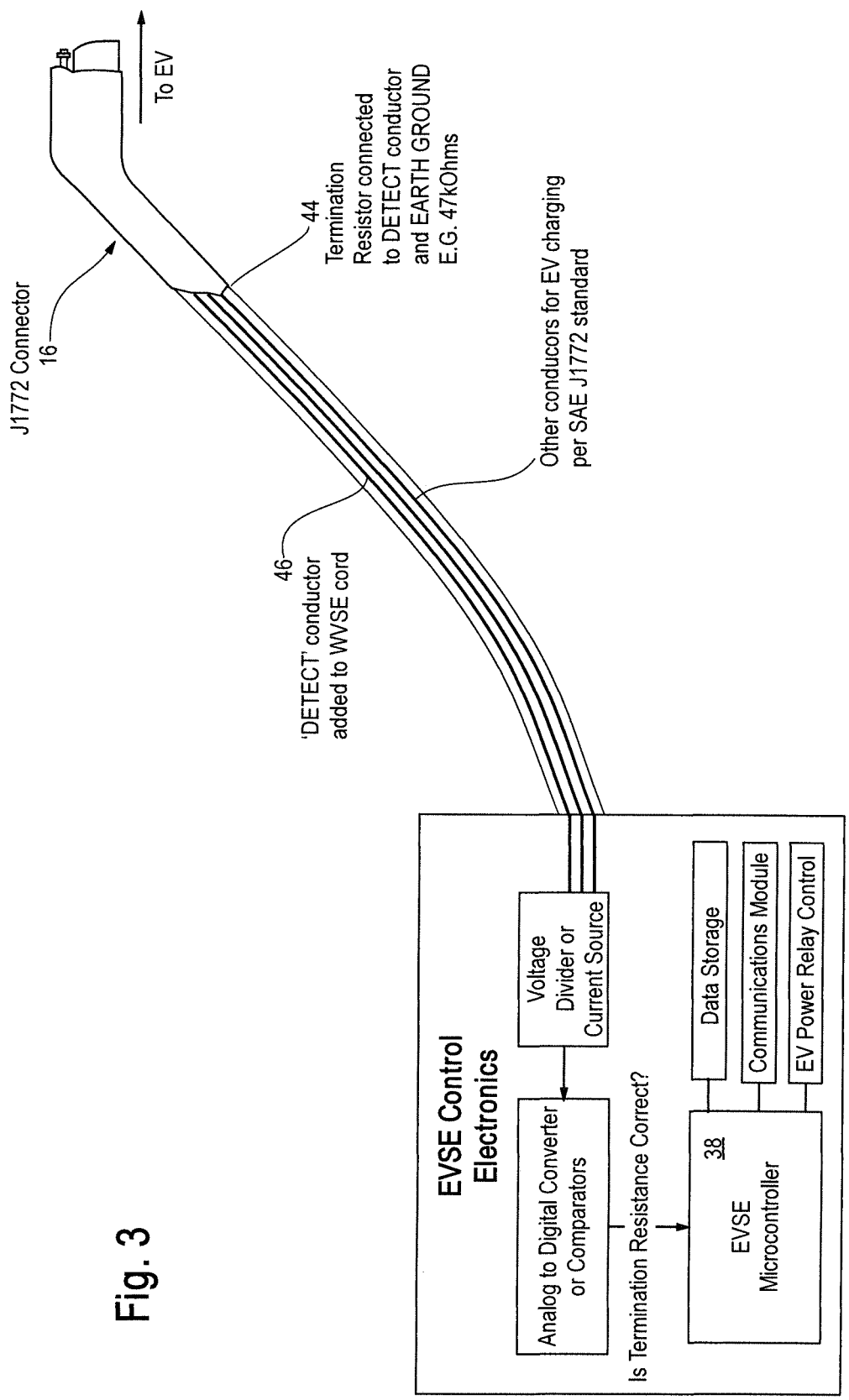
FIG. 3 is a block diagram of a cord damage or removal detector.
Figure 6A:
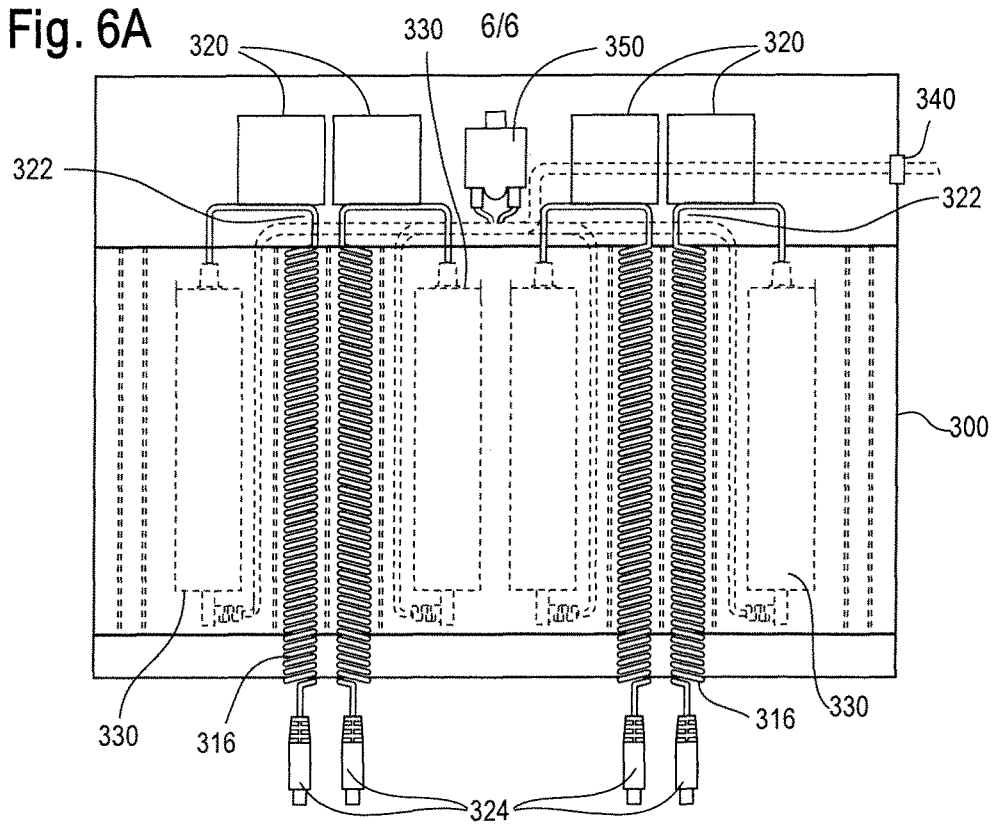
FIGS. 6a-c show, exposed front, bottom and side views of an alternative "curly cord" embodiment of the present invention.
Figure 6B:
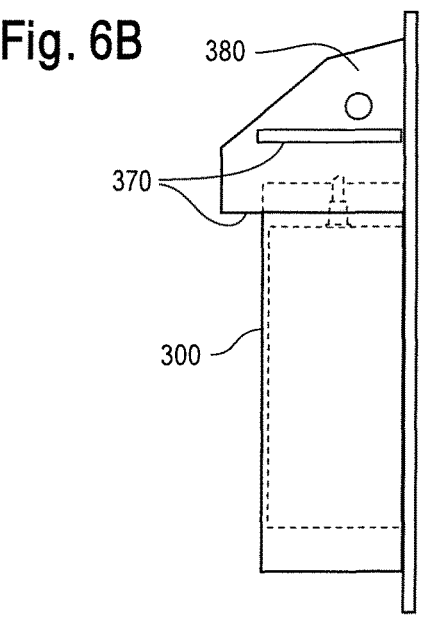
Figure 6C:
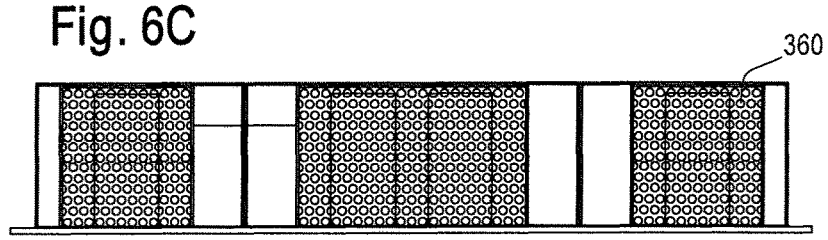

Finally, it should be noted certain features of the present invention can be accomplished with an alternative charging station 300, as shown in FIGS. 6a-c. With this charging station, in place of a charging cable housed inside of a reel, this embodiment comprises a series of "curly cord" or coiled cable connectors 316, each of which includes a mechanical cord reel 320 for retracting or extending a tether 322 which extends coaxially inside the curve of the connectors 316 and terminates with the charging coupler 324. In this embodiment each connector 316 includes its own power supply 330, each of which derive from an incoming power source 340 which is governed by a circuit breaker 350. In addition, the charging station 300, which in this example is a wall mounted cabinet form factor, but may be placed in other form factors as shown in FIGS. 4 and 5, includes bottom venting 360 and top venting 370 to allow for heat dissipation via a "chimney effect." Additionally, in this embodiment, the top venting 370 is enables by slots or openings in a hood 380 over the charging station 300 to protect the charging station from adverse weather effects. Moreover, this embodiment may optionally further include one or more sensors (e.g., a temperature sensor) such as those used on FIGS. 1-3 to determine whether thermal buildup or temperature conditions in the charging station 300 should limit current output through the curly cord connector 316.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A vehicle charging system including a load management system for providing a limitation on the current supplied to an electric vehicle, the system comprising:
   a) An electric cord and vehicle connector assembly including a spool;
   b) A pilot signal provided via the electric cord and vehicle connector assembly for regulating the current supplied to the electric vehicle;
   c) A digital temperature sensor for measuring the temperature proximate to the spool; and
   d) A processor located on the vehicle charging system for receiving an input from the digital temperature sensor for measuring the temperature proximate to the spool, the processor modifying the pilot signal based upon such input so as to limit the level of current being supplied to the electric vehicle.

2. The vehicle charging system of claim 1 wherein the digital temperature sensor for measuring the temperature proximate to the spool comprises a sensor for determining the extent to which the electric cord has been extracted from the spool.

3. The vehicle charging system of claim 1, wherein the digital temperature sensor for measuring the temperature proximate to the spool comprises a thermistor for measuring the temperature proximate to the electric cord.

4. The vehicle charging of claim 1 further comprising a detection conductor in the cord, the detection conductor being operatively connected at one end to the processor, and at the other end to a resistor in the vehicle connector assembly.

\* \* \* \* \*